S. G. STEVENS.
SOIL CULTIVATING TOOL.
APPLICATION FILED APR. 19, 1915. RENEWED MAY 25, 1916.

1,190,338.    Patented July 11, 1916.

WITNESSES:
Dr. A. H. Schildt.
Mrs. D. H. Clough.

INVENTOR.
Sylvester G. Stevens

UNITED STATES PATENT OFFICE.

SYLVESTER GEORGE STEVENS, OF DULUTH, MINNESOTA.

SOIL-CULTIVATING TOOL.

1,190,338.  Specification of Letters Patent.  Patented July 11, 1916.

Application filed April 19, 1915, Serial No. 22,300. Renewed May 25, 1916. Serial No. 99,920.

*To all whom it may concern:*

Be it known that I, SYLVESTER GEORGE STEVENS, citizen of the United States, residing at Duluth, in the county of St. Louis and State of Minnesota, have invented certain new and useful Improvements in Soil-Cultivating Tools, of which the following is a specification, reference being had therein to the accompanying drawing.

My invention consists of certain improvements in soil cultivating tools and relates particularly to hand operated hoes.

The object is to so shape a hoe that the maximum efficiency possible may be derived therefrom, with a minimum effort on the part of the operator.

A further object is to so form the cutting edge of a hoe as to obtain the greatest extent thereof in proportion to the size and weight of the hoe.

Figure 1:
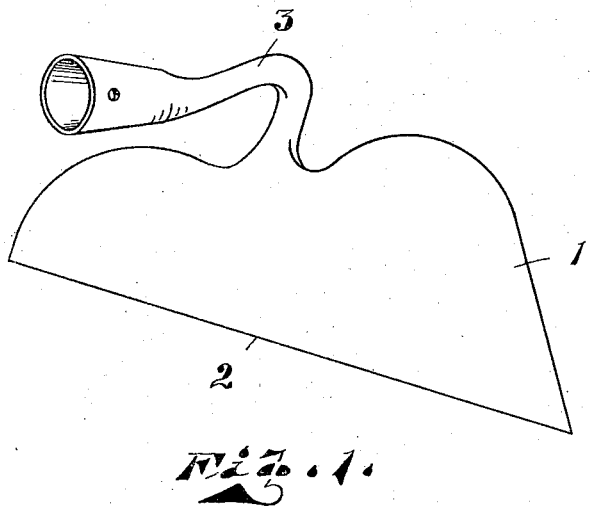
Figure 2:
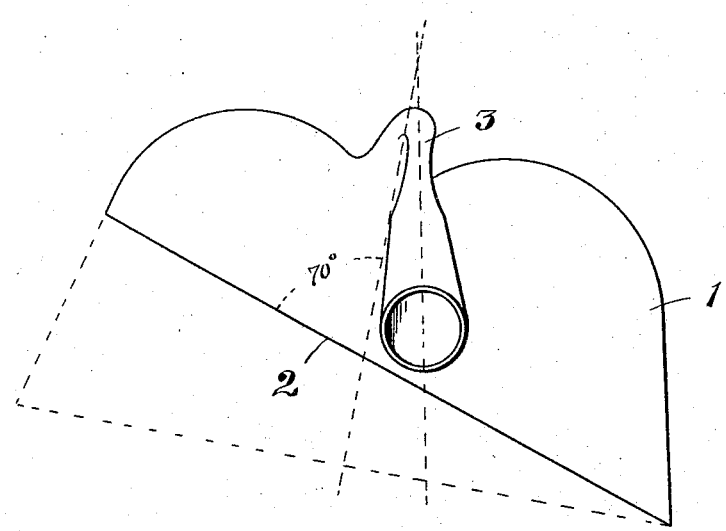

Referring to the accompanying drawings; Figure 1 is a perspective view of my improved hoe. Fig. 2 is a diagrammatic view of the hoe, showing its normal attitude with relation to the handle.

1 represents the blade of the hoe, having the cutting edge 2 thereof formed at an angle of substantially 70 degrees to the vertical central line thereof. The hoe blade 1 and shank 3 are of the usual form and my invention consists of simply forming the cutting edge thereof on the line of the greatest dimension of the blade. This produces a hoe having one side practically twice the weight of the other, which causes it to normally hang with the acute or long point downward and at all times presented to the work, and with the opposite lighter side extending at an angle from a vertical line through the handle of the hoe, thus acting as a steadying balance to the cutting side. This produces a tool having its cutting face normally presented to the work at an angle thereto, the lowermost extremity of such cutting face, being to one side of a vertical line through the handle of the hoe.

Having thus described my invention, what I claim and desire to secure by Letters Patent is;

1. A soil cultivating hoe having one side of the blade thereof substantially twice the area of the opposite side, the cutting corner of the larger side normally poised nearer a vertical plane through the center of the handle of the hoe than the cutting corner of the smaller side.

2. A soil cultivating hoe having one side of the blade thereof substantially twice the area of the opposite side and the cutting edge formed on an incline transverse the face of the hoe.

3. A hoe having a leading cutting corner and the cutting edge of the hoe formed on an incline transverse the face thereof, in such a manner as to cause the leading corner to normally poise nearer a vertical plane through the center of the handle of the hoe than the opposite corner.

In testimony whereof I hereunto affix my signature in the presence of two witnesses.

SYLVESTER GEORGE STEVENS.

Witnesses:
 A. C. DUNN,
 Dr. A. H. SCHILDT.

Copies of this patent may be obtained for five cents each, by addressing the "Commissioner of Patents, Washington, D. C."